United States Patent [19]

Kobayashi et al.

[11] Patent Number: 5,761,401
[45] Date of Patent: Jun. 2, 1998

[54] PARALLEL IMAGE GENERATION FROM CUMULATIVE MERGING OF PARTIAL GEOMETRIC IMAGES

[75] Inventors: Tadashi Kobayashi, Otsu; Akio Nishimura, Sakai; Yorihiko Wakayama, Katano; Kiyoshi Maenobu, Amagasaki; Kazu Segawa, Kadoma; Makoto Hirai, Suita; Kenji Nishimura, Sakai; Toshiya Naka, Moriguchi; Jiro Minehisa, Osaka; Minobu Abe, Hirakata, all of Japan

[73] Assignee: Matsushita Electric Industrial Co., Ltd., Osaka, Japan

[21] Appl. No.: 566,482

[22] Filed: Dec. 4, 1995

Related U.S. Application Data

[63] Continuation of Ser. No. 97,959, Jul. 27, 1993, abandoned.

[30] Foreign Application Priority Data

Jul. 27, 1992 [JP] Japan .................. 4-199391
Sep. 21, 1992 [JP] Japan .................. 4-251028

[51] Int. Cl.⁶ ............................................. G06T 11/40
[52] U.S. Cl. .................................. 395/130; 395/505
[58] Field of Search ......................... 395/120, 122, 395/135, 504–506, 130

[56] References Cited

U.S. PATENT DOCUMENTS

| | | | |
|---|---|---|---|
| 4,658,247 | 4/1987 | Gharachorloo | 395/122 X |
| 4,882,683 | 11/1989 | Rupp et al. | 395/516 |
| 4,885,703 | 12/1989 | Deering | 395/122 |
| 4,949,280 | 8/1990 | Littlefield | 395/505 |
| 4,951,232 | 8/1990 | Hannah | 395/122 |
| 5,175,806 | 12/1992 | Muskovitz et al. | 395/125 |
| 5,245,700 | 9/1993 | Fossum | 395/122 |
| 5,251,290 | 10/1993 | Pabon | 395/120 |
| 5,251,322 | 10/1993 | Doyle et al. | 395/800 |
| 5,255,360 | 10/1993 | Peaslee et al. | 395/130 X |
| 5,276,798 | 1/1994 | Peaslee et al. | 395/505 |
| 5,307,449 | 4/1994 | Kelley et al. | 395/119 |
| 5,485,559 | 1/1996 | Sakaibara et al. | 395/133 |
| 5,546,530 | 8/1996 | Grimaud et al. | 395/122 X |
| 5,557,711 | 9/1996 | Malzbender | 395/122 |

FOREIGN PATENT DOCUMENTS

92/09947  6/1995  WIPO.

OTHER PUBLICATIONS

James D. Foley et al., "Computer Graphics—Principles and Practice, Second Edition", *Addison–Wesley Publishing Company*, pp. 201–225 and 649–907 (1990).
David F. Rogers et al., "State of the Art in Computer Graphics—Visualization and Modeling", *Springer–Verlag*, pp. 33–56 (1991).
EPO Search Report (93111797.2) dated Dec. 21, 1994.

*Primary Examiner*—Anton W. Fetting
*Attorney, Agent, or Firm*—Ratner & Prestia

[57] ABSTRACT

An apparatus for parallel image generation has four geometric data buffers for storing four partial geometric data, respectively, and four image generators connected respectively to the four geometric data buffers. Each image generator generates a partial image data for every pixel in a frame. Further provided are four image mergers connected respectively to the four image generators. The four image mergers are also connected in series. An initial image generator for generating a background image is connected to the first image merger for merging the background image data and the partial image data from the first image generator. Each of the second to fourth image merger merges an output merged data from the previous image merger and the partial image data from the corresponding image generator. A timing control is connected to the four image mergers for controlling the merging timing in such a manner that the image merger carries out the merging operation of a pixel after the previous image merger has carried out the merging operation of the same pixel.

9 Claims, 10 Drawing Sheets

Fig.5a PRIOR ART

| 1 | 2 |
|---|---|
| 3 | 4 |

Fig.5b PRIOR ART

| 1 | 2 | 1 | 2 | 1 | 2 |
|---|---|---|---|---|---|
| 3 | 4 | 3 | 4 | 3 | 4 |
| 1 | 2 | 1 | 2 | 1 | 2 |
| 3 | 4 | 3 | 4 | 3 | 4 |
| 1 | 2 | 1 | 2 | 1 | 2 |
| 3 | 4 | 3 | 4 | 3 | 4 |
| 1 | 2 | 1 | 2 | 1 | 2 |
| 3 | 4 | 3 | 4 | 3 | 4 |
| 1 | 2 | 1 | 2 | 1 | 2 |
| 3 | 4 | 3 | 4 | 3 | 4 |

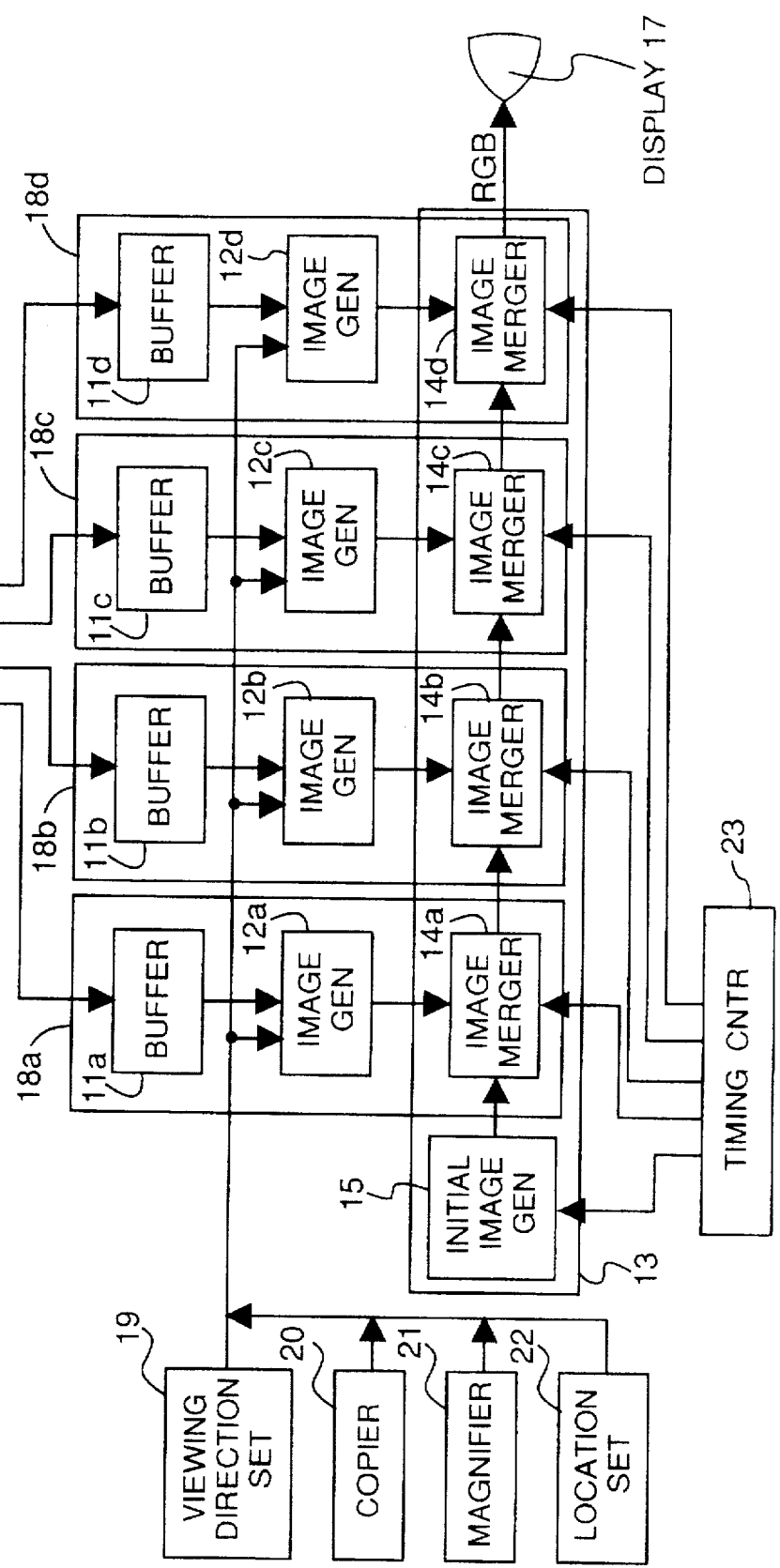

PARALLEL IMAGE GENERATION FROM CUMULATIVE MERGING OF PARTIAL GEOMETRIC IMAGES

This application is a continuation of application Ser. No. 08/097,959 filed Jul. 27, 1993, abandoned.

BACKGROUND OF THE INVENTION

1. Field of the Invention

The present invention relates to an apparatus for parallel image generation, and more particularly, to an apparatus for generating three-dimensional images based on geometric data defined by three-dimensional coordinates.

2. Description of the Prior Art

Technologies for generating three-dimensional (3D) images that can be viewed from any position based on the geometric data of an object expressed by 3D coordinates have been rapidly developed in recent years. These technologies are a particularly effective tool in product design, generating special video effects in movies and television broadcasts, and in simulations of physical phenomena.

A typical prior art image generation apparatus is shown in FIG. 2. Geometric data expressing the object to be displayed in 3D coordinates is stored in the geometric data buffer 21, and is output to the image generator 22. The geometric data is usually a set of small geometric shapes ("primitives") that can be easily handled, and the primitives are usually polygons. In other words, each object is expressed as a set of polygons. The image generator 22 processes and manipulates the geometric data to generate the display image. Data processing methods used in image generation are described in detail in the literature (e.g., *Computer Graphics PRINCIPLES AND PRACTICES*, Foley, van Dam, Feiner, Hughes; Addison-Wesley Publ. Co. (1990). In one common method, the input primitives are converted to the coordinates of the screen coordinate system by a coordinate converter 23. The intensity of each pixel forming the generated image is calculated by the pixel data generator 24 based on the primitives occupying the pixel space and the surface attributes of the primitives, and such ambient environment attributes as the light source. Preselected image data can be referenced at this time to apply special image effects (such as texture mapping) to the primitives.

The processing time is roughly proportional to the number of primitives in the coordinate conversion process, and to the number of pixels for which the intensity is calculated in the image generation process. When plural primitives apply to a pixel in the image, the front-most primitive must be selected to calculate the pixel intensity according to the surface attributes of the selected primitive. The generated image is finally displayed by the displaying device 25.

In addition to the massive amount of numerical processing required for this image generation process, large amounts of geometric data must be used to generate realistic images, and extremely high speed image generation is necessary for certain kinds of simulators. In an image generation apparatus as shown in FIG. 2, it is impossible in practical terms to achieve the required image generation capacity with a single apparatus. Plural such image generation apparatuses are therefore operated in parallel in order to improve the image generation capability. A method of doing this is described in detail in *State of the Art in Computer Graphics* (David F. Rogers, Rae A. Earnshaw, eds., Springer-Verlag New York Inc. (1991)).

An apparatus for parallel image generation using a conventional parallel processing method is described below with reference to FIG. 3, a block diagram of a conventional apparatus for parallel image generation.

The geometric data buffers 31 hold part (¼ each in the example in FIG. 3) of the geometric data of the object to be displayed. One image generator 32 is connected to each of the geometric data buffers 31. The pixel data buffer 33 comprises memory areas for storing the attributes of each pixel in the generated image, and the distance (depth value) of each pixel from the viewing point. These buffers are called the "frame buffer" and the "Z buffer." The pixel attributes may include, for example, the red, green, and blue (RGB) intensity values.

The operation of this apparatus for parallel image generation is described below. One-fourth of the total geometric data is input to each of the image generator 32, each of which separately applies the image generation process to the input data to calculate the attributes and depth value of each pixel. Each image generator 32 comprises an image buffer (texture buffer) for texture mapping, thus enabling texture mapping to be applied by image buffer referencing. Each image generator 32 outputs to the pixel data buffer 33. The pixel data buffer 33 compares the input depth values with the depth values stored in the Z buffer 35, and writes the input value to the corresponding pixel in the Z buffer 35 and frame buffer 34 only when the input depth value is smaller than the buffered value. When all of the pixel data has been input and one image has been completed, the contents of the frame buffer 34 are output to the image display device 36, which displays the image.

It is to be noted that while the example in FIG. 3 is described with plural geometric data buffers, it is also possible for a single geometric data buffer to distribute the geometric data to plural image generators. The operation from the image generator in this case, however, is the same as that described above.

A second example of a conventional apparatus for parallel image generation is shown in FIG. 4. In this example there is one geometric data buffer 41 used to buffer all of the geometric data for the object to be displayed. Plural image generators 42 are connected to the single geometric data buffer 41. The pixel selector 43 selects the required pixel data from the pixel data output from the plural image generators 42, and outputs the result to the image display device 44.

The operation of this apparatus for parallel image generation is described below. The geometric data buffer 41 outputs the geometric data to plural image generators 42. In this apparatus, however, all geometric data is output from the geometric data buffer 41 to all of the image generators 42 rather than distributing the geometric data. The same geometric data is therefore input to each image generator 42.

The image generator 42 internally generate only part of the pixel data for the generated image, specifically one-fourth of the pixel data in this example. Any required texture mapping is also applied. There are two common methods used for this internal pixel allocation as shown in FIGS. 5 (*a*) and 5 (*b*). In the method shown in FIG. 5 (*a*), the total image area is divided into four regions, and each image generator 42 processes one region. In the method shown in FIG. 5 (*b*), the image is divided into extremely small areas (typically equivalent to one pixel each), and these areas are allocated to the image generator 42 such that adjacent areas are not assigned to the same image generator 42.

Due to the complexity of the communications bus when one geometric data buffer 41 outputs to plural (four in FIG. 4) image generator 42 and the number of image generators 42 becomes large, it is also possible to provide an equal number of geometric data buffers and the image generator for a simple 1:1 communications bus. Note that in this case all of the geometric data buffers store the same geometric data content. The pixel selector 43 selects the required pixel data from the outputs of the plural image generators 42, and outputs the result to the image display device 44.

The ideal parallel data processing apparatus obtains a processing capacity proportional to the number of parallel processing units (i.e., an n-times increase in processing capacity for n image generators), and enables an unlimited increase in the number of parallel processing units. As described below, however, the above described apparatuses for parallel image generation do not achieve this ideal.

In the first conventional example shown in FIG. 3, all image generators 32 output the pixel data to one pixel data buffer 33. The frame buffer 34 and Z buffer 35 are usually achieved using a semiconductor memory device, and simultaneous reading or writing of a large number of data is not possible. It is therefore necessary to provide some sort of arbiter to prevent the plural image generators from outputting simultaneously. This introduces a drop in image generation efficiency because pixel data output from the image generator 32 is interrupted when the arbiter is operating. Efficiency further deteriorates as the number of image generators 32 is increased because the frequency of simultaneous pixel data output also increases. As a result, there is obviously a limit on the possible increase in the number of parallel processing units.

In the second example shown in FIG. 4, there is no reduction in the coordinate conversion processing time because the same geometric data is input to all image generators. For example, if the ratio of the time required for coordinate conversion processing to the time required for pixel generation processing is assumed to be 1:1, parallel operation of four parallel processing units as shown in FIG. 4 simply reduces the pixel generation time to ¼, resulting in an overall image generation time of ⅝.

It is also possible to combine the apparatus for parallel coordinate conversion processing using primitives with the apparatus for parallel pixel generation processing using pixel units. In this case, however, the communications bus from the coordinate converter to the pixel data generator becomes increasingly complex as the number of parallel processing units increases, and it is not possible in practical terms to unlimitedly increase the number of parallel processing units.

When the need for texture mapping is also considered, the apparatus must be structured to store the same texture mapping data in all parallel processing units, or to enable all parallel processing units to access a single texture buffer because texture mapping is applying by the parallel processing units. Because a high speed, large capacity texture buffer is required, providing an equal number of texture buffers and parallel processing units greatly increases the scale of the apparatus for image generation. In addition, using a single texture buffer requires a complex communications bus and an arbiter, thus prohibiting an unlimited increase in the number of parallel processing units.

SUMMARY OF THE INVENTION

Therefore, the object of the present invention is to provide an apparatus for parallel image generation that can obtain a processing capacity proportional to the number of parallel processing units, and enables an unlimited increase in the number of parallel processing units.

To achieve this object, an apparatus for parallel image generation according to the present invention comprises:

three-dimensional image generation means for generating a three-dimensional geometric data of an object;

distribution means for dividing said three-dimensional geometric data to N (N is an integer greater than one) partial geometric data;

first to Nth geometric data buffers for storing said N partial geometric data, respectively;

first to Nth image generation arrangements connected respectively to said first to Nth geometric data buffers, each image generation arrangement generating a partial image data for every pixel in a frame;

first to Nth image merging arrangements connected respectively to said first to Nth image generation arrangements, said first to Nth image merging arrangements also connected in series;

initial image generation means for generating a background image, said initial image generation means connected to said first image merging arrangement, said first image merging arrangement merging said background image data and said partial image data from said first image generation arrangement and an ith ($1<i\leq N$) image merging arrangement merging an output merged data from (i−1)th image merging arrangement and said partial image data from an ith image generation arrangement; and timing control means connected to said first to Nth image merging arrangements for controlling the merging timing in said first to Nth image merging arrangements such that said ith image merging arrangement carries out the merging operation of a pixel after (i−1)th image merging arrangement has carried out the merging operation of the same pixel.

According to a preferred embodiment of the present invention, the partial image data comprises a depth value and attributes of each pixel. The attributes of each pixel can be color data (R, G, B) or can be surface coordinate data (U, V) of the object.

An apparatus for parallel image generation according to the present invention can therefore improve processing capacity proportionally to the number of parallel processing units, and enables the unlimited addition of parallel processing units by connecting plural geometric data buffers, plural image generators connected 1:1 to the geometric data buffers, and plural image mergers connected in series to the image generators with a display device connected to the end of the series connection.

BRIEF DESCRIPTION OF THE DRAWINGS

The present invention will become more fully understood from the detailed description given below and the accompanying diagrams wherein:

FIGS. 5a and 5b are illustrations showing two methods of dividing the image processed by a prior art apparatus for parallel image generation.

FIG. 10 is a block diagram of an apparatus for parallel image generation according to the second embodiment of the present invention.

DESCRIPTION OF PREFERRED EMBODIMENTS

The first embodiment of an apparatus for parallel image generation according to the present invention is described below with reference to the accompanying FIG. 1 and FIGS. 6–9.

Figure 1:
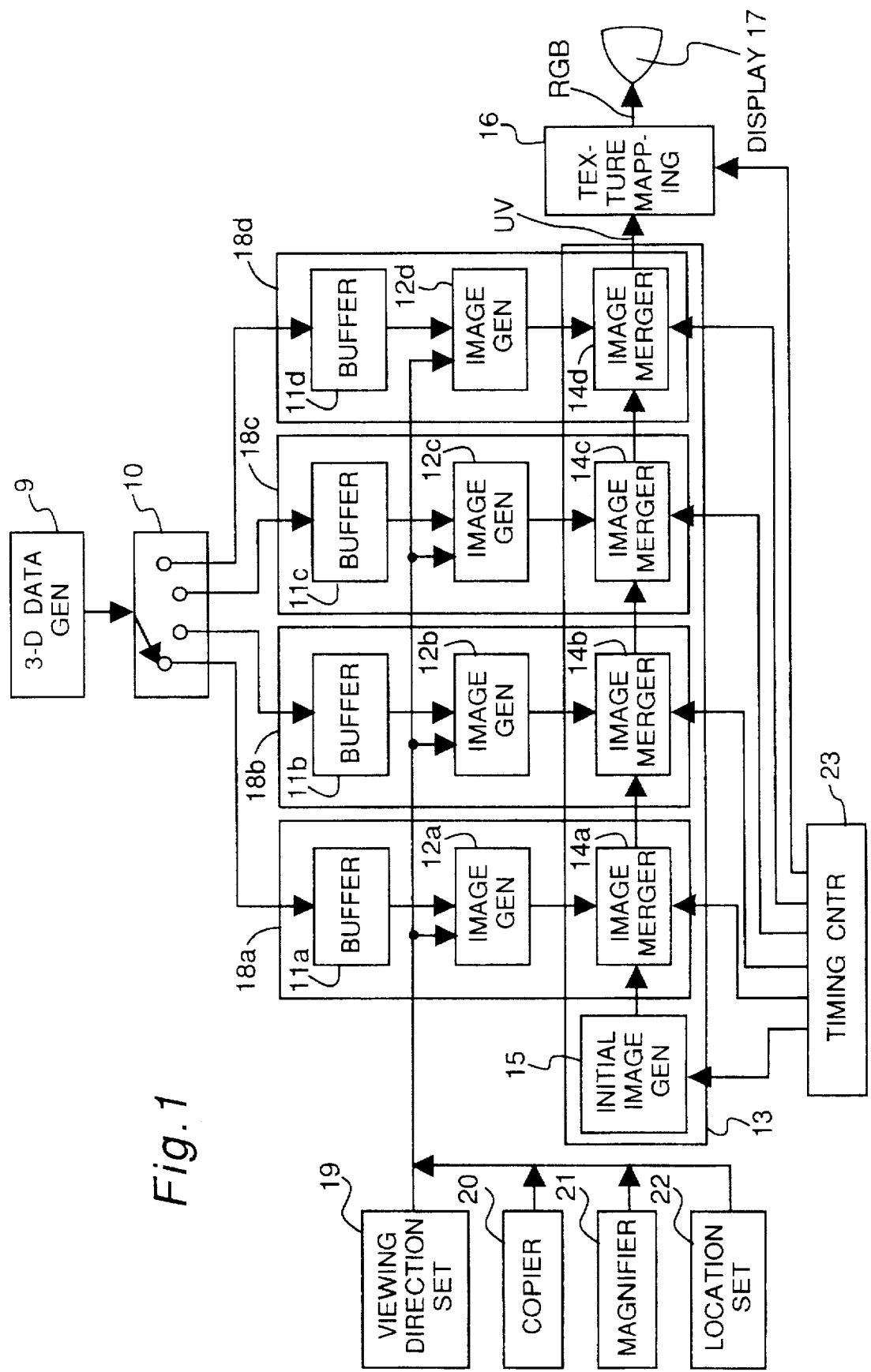
FIG. 1 is a block diagram of an apparatus for parallel image generation according to the first embodiment of the present invention.
Figure 2:
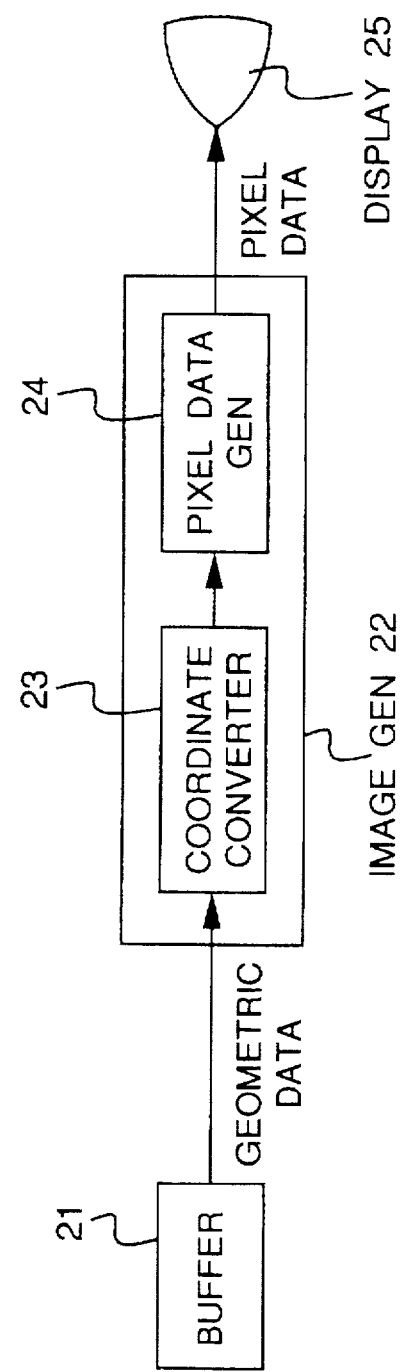
FIG. 2 is a block diagram of a prior art apparatus for image generation.
Figure 3:
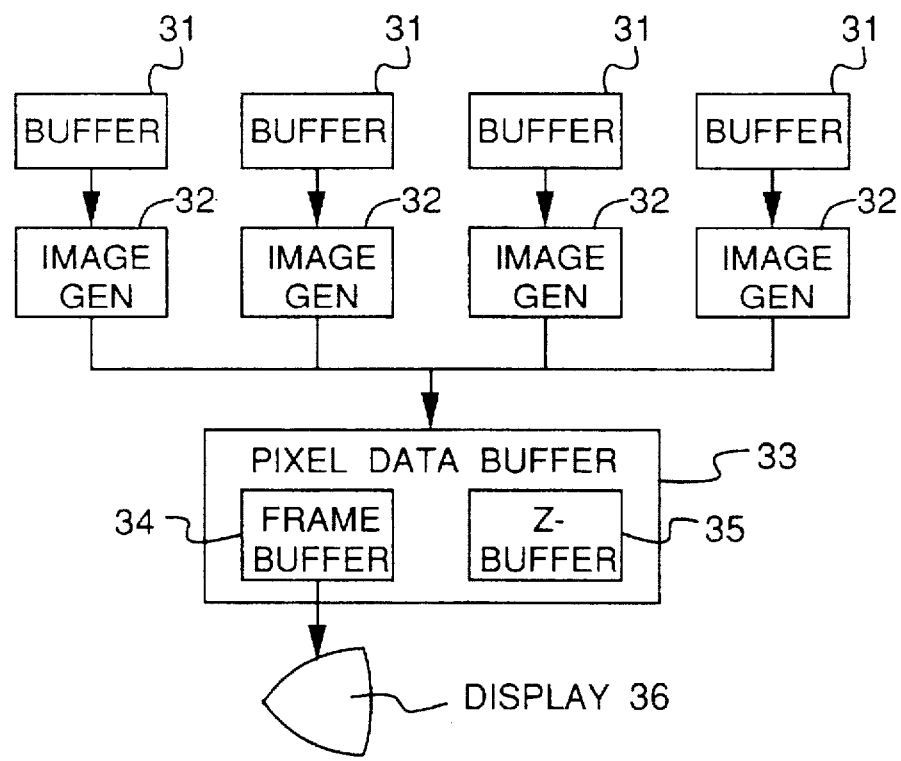
FIG. 3 is a block diagram of one example of a prior art apparatus for parallel image generation.
Figure 4:
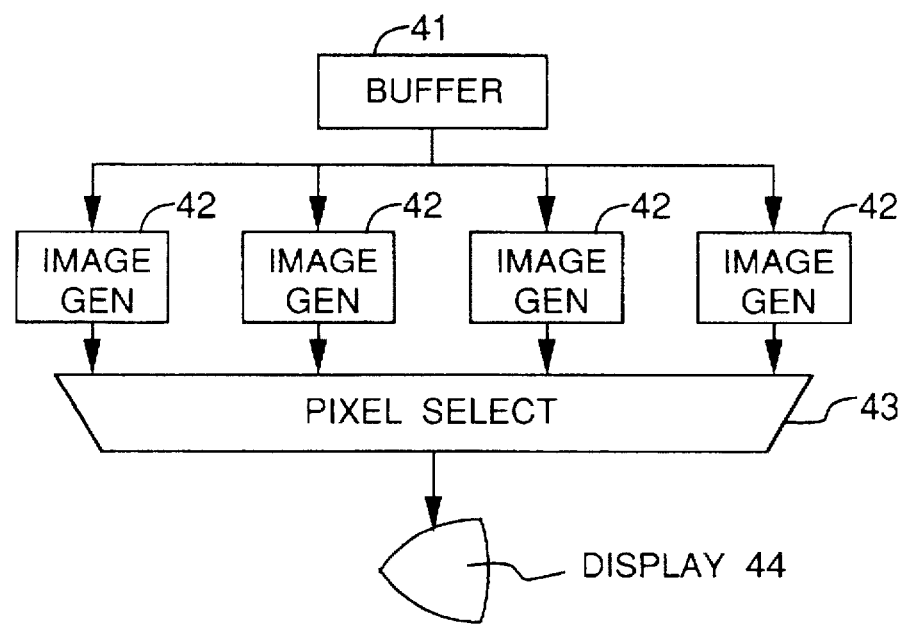
FIG. 4 is a block diagram of a second example of a prior art apparatus for parallel image generation.

As shown in FIG. 1, the parallel image generation apparatus comprises a three-dimensional data generator 9, a data distributor 10, plural, such as four, geometric data buffers 11a, 11b, 11c and 11d, four image generators 12a, 12b, 12c and 12d connected to the four geometric data buffers 11a, 11b, 11c and 11d, respectively, and four image mergers 14a, 14b, 14c and 14d connected to the four image generators 12a, 12b, 12c and 12d, respectively. The four image mergers 14a, 14b, 14c and 14d are connected in series between an initial image generator 15 and a texture mapping unit 16. Furthermore, the initial image generator 15, the four image mergers 14a, 14b, 14c and 14d, and the texture mapping unit 16 are connected to a timing control 23. The timing control 23 may be separately provided in four image mergers 14a, 14b, 14c and 14d. The output of the texture mapping unit 16 is connected to a display device, such as a color CRT 17. A viewing direction setting unit 19, a copying unit 20, a magnifying unit 21 and a location setting unit 22 are connected to each of the four image generators 12a, 12b, 12c and 12d. The viewing direction setting unit 19 sets the viewing direction of the object; the copying unit 20 sets the number of objects to be displayed in one frame; the magnifying unit 21 sets the size the object to be displayed; and location setting unit 22 sets the location of the object to be displayed.

It is noted that the initial image generator 15 and the four image mergers 14a, 14b, 14c and 14d define an image merging pipeline 13. Also, geometric data buffer 11a, image generator 12a and image merger 14a connected in series define a partial processing unit 18a. In the embodiment shown in FIG. 1, there are four partial processing units, 18a, 18b, 18c and 18d.

It is also noted that while this embodiment is described with four parallel partial processing units 18a, 18b, 18c and 18d, the number of the parallel partial processing units can be any number equal to or greater than two.

Figure 6A:
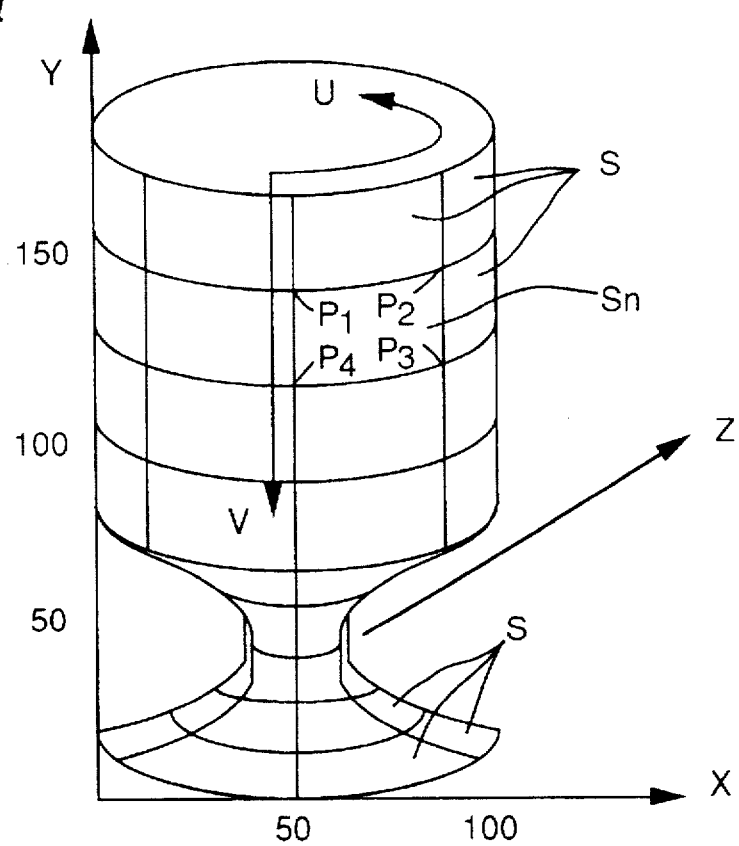
FIG. 6a is a graph showing three-dimensional images of a cup for the image processing.

As shown in FIG. 6a, it is assumed that in the present embodiment, the three-dimensional data generator 9 generates three-dimensional data ($X_1$, $Y_1$, $Z_1$) in the local coordinates, of an object, such as a cup, and also surface two-dimensional data (U, V) of the cup. More specifically, the surface of the cup is divided into plural rectangular segments S and data ($X_1$, $Y_1$, $Z_1$, U, V) for each of the four corners P1, P2, P3 and P4 of the segment S is generated. An example of the data ($X_1$, $Y_1$, $Z_1$, U, V) obtained with respect to the segment Sn is given in Table 1 below.

TABLE 1

| Corners | $X_1$ data | $Y_1$ data | $Z_1$ data | U data | V data |
| --- | --- | --- | --- | --- | --- |
| P1 | 50 | 150 | 0 | 0 | 10 |
| P2 | 85 | 150 | 15 | 10 | 10 |
| P3 | 85 | 125 | 15 | 10 | 20 |
| P4 | 50 | 125 | 0 | 0 | 20 |

Data similar to the above is generated for each segment S to define a geometric data of the entire cup. The generated geometric data are applied to the data distributor 10, from which the geometric data is distributed to four buffers 11a, 11b, 11c and 11d, each is formed by a semiconductor memory device, magnetic disk, or any other data storage device.

Figure 6B:
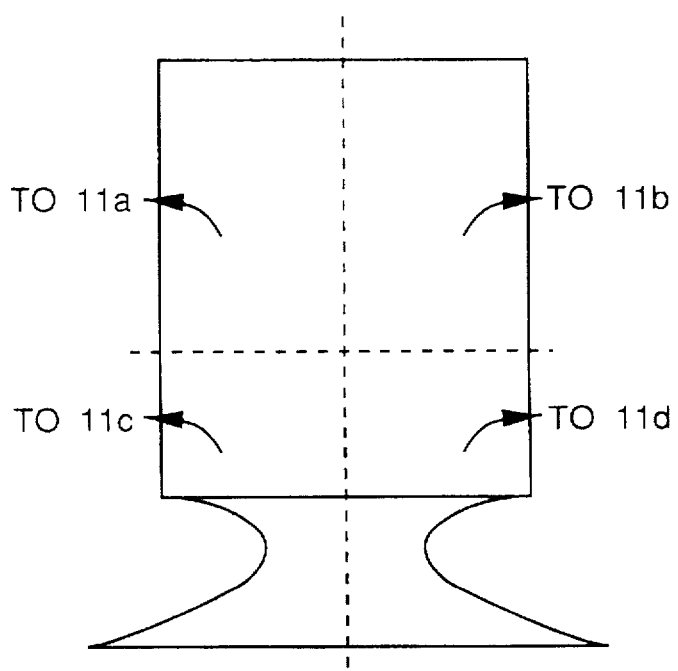
FIG. 6b is a diagrammatic view showing data division of the cup image.

It is assumed that, after the distribution by the distributor 10, buffer 11a is stored with top left portion data of the cup, buffer 11b with top right portion data, buffer 11c with bottom left portion data, and buffer 11d with bottom right portion data, as shown in FIG. 6b.

Figure 6C:
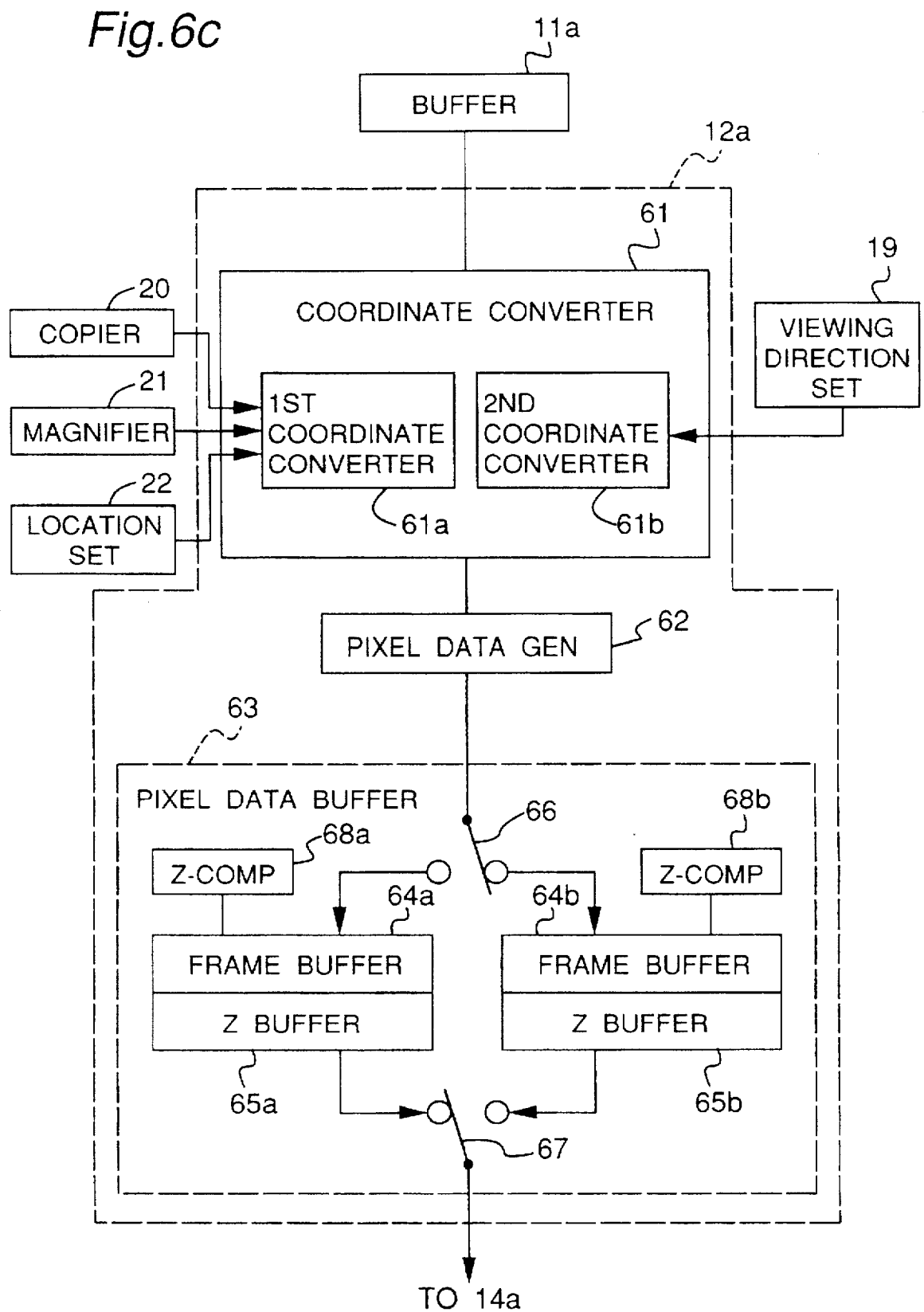
FIG. 6c is a block diagram of the image generator according to the preferred embodiment of the present invention.

Referring to FIG. 6c, a detail of the image generator 12a is shown. The image generator 12a has a coordinate converter 61 which includes a first coordinate converter 61a and a second coordinate converter 61b, a pixel data generator 62, first frame buffer 64a, first Z buffer 65a, second frame buffer 64b, second frame buffer 65b and switches 66 and 67. Frame buffers 64a and 64b are coupled with Z-comparators 68a and 68b, respectively. Two sets of frame buffer and Z-buffer define a pixel data buffer 63.

The first coordinate converter 61a receives ($X_1$, $Y_1$, $Z_1$, U, V) data from buffer 11a and also various conversion parameters from copying unit 20, magnifying unit 21 and location setting unit 22, and converts the data ($X_1$, $Y_1$, $Z_1$, U, V) expressed in the local coordinates to data ($X_w$, $Y_w$, $Z_w$, U, V) expressed in the word coordinates. Therefore, the data ($X_w$, $Y_w$, $Z_w$, U, V) expressed in the world coordinates represent one or more objects arranged in a hypothetical room in a layout determined by the parameters from units 20, 21 and 22. According to the present exemplification, it is assumed that one cup of the standard size is positioned at the left side of the screen. Therefore, in the image generator 12a, one quarter data of the cup is processed.

The second coordinate converter 61b receives the data ($X_w$, $Y_w$, $Z_w$, U, V) in the world coordinates and also conversion parameters from the viewing direction setting unit 19, and converts the data ($X_w$, $Y_w$, $Z_w$, U, V) expressed by the world coordinates to the data ($X_s$, $Y_s$, $Z_s$, U, V) expressed by screen coordinates.

The geometric data expressed by screen coordinates ($X_s$, $Y_s$, $Z_s$, U, V) represent a segment-oriented picture of the objects, i.e., cups in the hypothetical room viewed from a selected direction determined by the viewing direction setting unit 19. In other words, the viewing direction setting unit 19 determines the eye location for viewing the sight in the hypothetical room.

Here, data $Z_s$ represents the depth of a pixel spot in the frame. In other words, data $Z_s$ represents the distance from the eye location to the object, so that farther the object is from the eye location, greater the data $Z_s$.

The data expressed by the screen coordinates ($X_s$, $Y_s$, $Z_s$, U, V) constitute segment-oriented picture data for one frame on a television screen. The overlapping image, i.e, the front wall and the hind wall of the cup are both included in the segment-oriented picture data. The segment-oriented picture data ($X_s$, $Y_s$, $Z_s$, U, V) expressed in the screen coordinates is applied to the pixel data generator 62.

In the pixel data generator 62, the segment-oriented picture data ($X_s$, $Y_s$, $Z_s$, U, V) expressed in the screen coordinates is changed to pixel data by filling pixel data ($Z_s$, U, V), and $X_s$, $Y_s$ data expressed in the screen coordinates, inside each segment. The pixel data ($Z_s$, U, V) are serially transmitted to either one of frame buffers 64a and 64b determined by the switched position of the switch 66. Each of the buffers 64a, 65a, 64b and 65b has a capacity sufficient to store one frame data.

When a pixel data generated from the pixel data generator 62 is assigned in accordance with data $X_s$, $Y_s$ to a location in the frame buffer which is already stored with a previously generated pixel data, the newly generated pixel data and the previously stored pixel data would occupy the same location, and thus these two pixel data assigned to the same location are called conflicting pixel data. The Z-buffers 65a and 65b are coupled with Z-comparators 68a and 68b, respectively, for comparing $Z_s$ value of two conflicting pixel data. By the result of the comparison, the pixel data with the greater $Z_s$ value is removed to cancel the hidden side image data. In other words, the hidden surface removal is carried out while storing data in the frame buffer.

By using two sets of frame and Z-buffers, the pixel data buffer 63 can simultaneously accumulate the pixel data from the pixel data generator 62 while outputting pixel data to the image merger 14a.

Switches 66 and 67 operate synchronizingly and are in the switched position shown in FIG. 6c for one frame period and are in the opposite switched position in the next frame period. Thus, switches 66 and 67 operate simultaneously and are switched alternately between the two switched positions. During the switched position shown in FIG. 6c, the one frame pixel data ($Z_s$, U, V) are sequentially stored through switch 66 in buffers 64b and 65b and, at the same time, the one frame pixel data ($Z_s$, U, V) stored in buffers 64a and 65a in the previous frame operation cycle are sequentially read out through switch 67 to the image merger 14a. Thereafter, the buffers 64a and 65a are initialized, ready for receiving the next frame pixel data.

The image generators 12b, 12c and 12d have the same structure as the image generator 12a. Therefore, four portions of one frame image are processed parallel in four image generators 12a, 12b, 12c and 12d.

Instead of using four frame buffers 64a, 64b, 65a and 65b, it is possible to use four scan line buffers, so that smaller capacity buffers can be used.

Also, instead of rectangular segments S, any other polygon segments, such as triangle segments can be used to generate the segment-oriented picture data.

Figure 7:
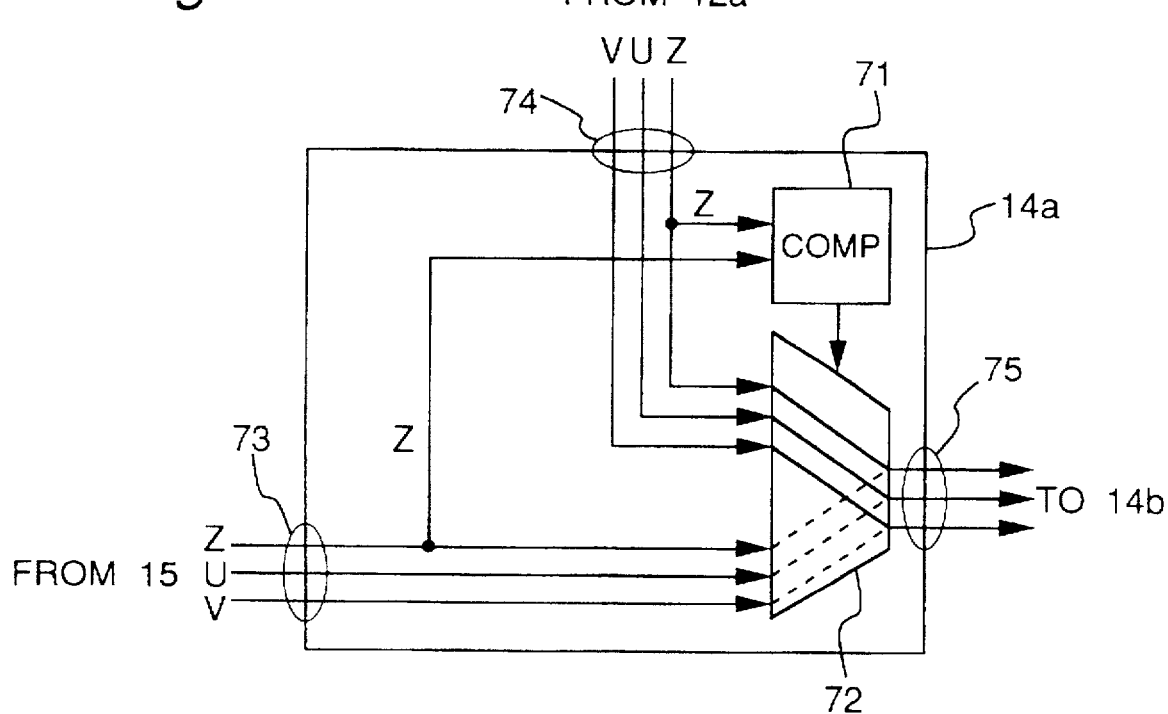
FIG. 7 is a block diagram of the image merger according to the preferred embodiment of the present invention.

Referring to FIG. 7, a detail of the image merger 14a is shown. The image merger 14a has a comparator 71, a selector 72, two inputs 73 and 74 and one output 75. The two inputs 73 and 74 sequentially receive pixel data from the initial image generator 15 and from the image generator 12a, respectively, for the same identical pixel position, and selector 72 selects one pixel data in a manner described below.

Figure 9A:
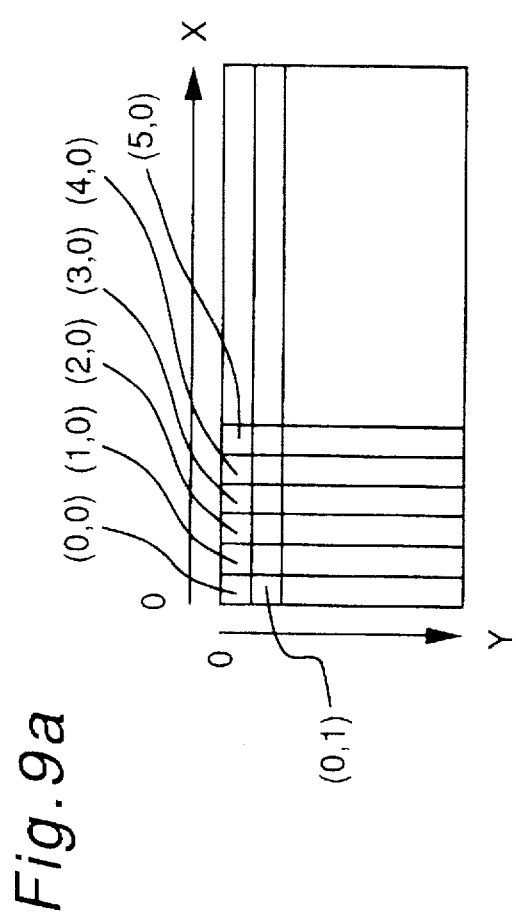
FIGS. 9a and 9b are illustrations of the pixel data stream input to the image merger.
Figure 9B:
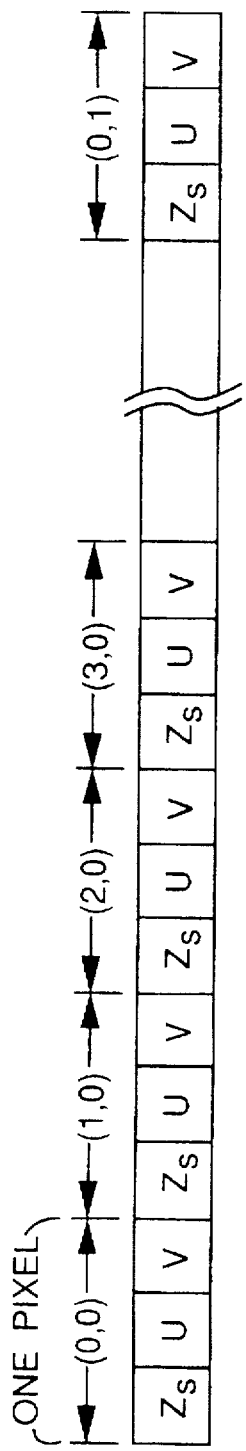

As shown in FIG. 9a, the pixel data ($Z_s$, U, V) from the frame buffer and Z buffer 64a, 65a (or 64b, 65b) are sequentially read out in a regular sequence from left to right starting at the top horizontal scan line, and advancing to the left end of the next horizontal scan line at the right end of each line. As shown in FIG. 9b, the generated data from the buffer are serially produced by the repetition of $Z_s$, U, V, and one set of these data $Z_s$, U, V represent one pixel data. The data $Z_s$, U, V can be transmitted in a single line in a time sharing manner or in three separate lines, as shown in FIG. 7.

The $Z_s$ value from a previous stage, i.e., the initial image generator 15 is compared with $Z_s$ value from the image generator 12a, and determines which is smaller. The comparator 72 produces a signal indicating which of the two data (one from the initial image generator 15 and the other from the image generator 12a) has a smaller $Z_s$ value, and selector 72 selects and produces data that has the smaller $Z_s$ value. For example, when the data from the image generator 12a has a $Z_s$ value smaller than that from the initial image generator 15, it is understood that the object expressed by the pixel data from the image generator 12a is located closer to the eye than the object expressed by the pixel data from the initial image generator 15. In other words, the object from the initial image generator 15 is located behind the object from the image generator 12a and thus, it can not be seen. Therefore, selector 72 selects the pixel data of the object that is located closer to the eye position.

The image merger 14b, 14c and 14d have the same structure as the image merger 14a.

The timing control 23 connected to the image mergers 14a, 14b, 14c and 14d delays the processing in each image merger by one pixel processing cycle. For example, when the image merger 14d is processing the pixel data at (5,0) shown in FIG. 9a, the image merger 14c is processing the pixel data at (4,0), the image merger 14b is processing the pixel data at (3,0), and the image merger 14a is processing the pixel data at (2,0).

Figure 8:
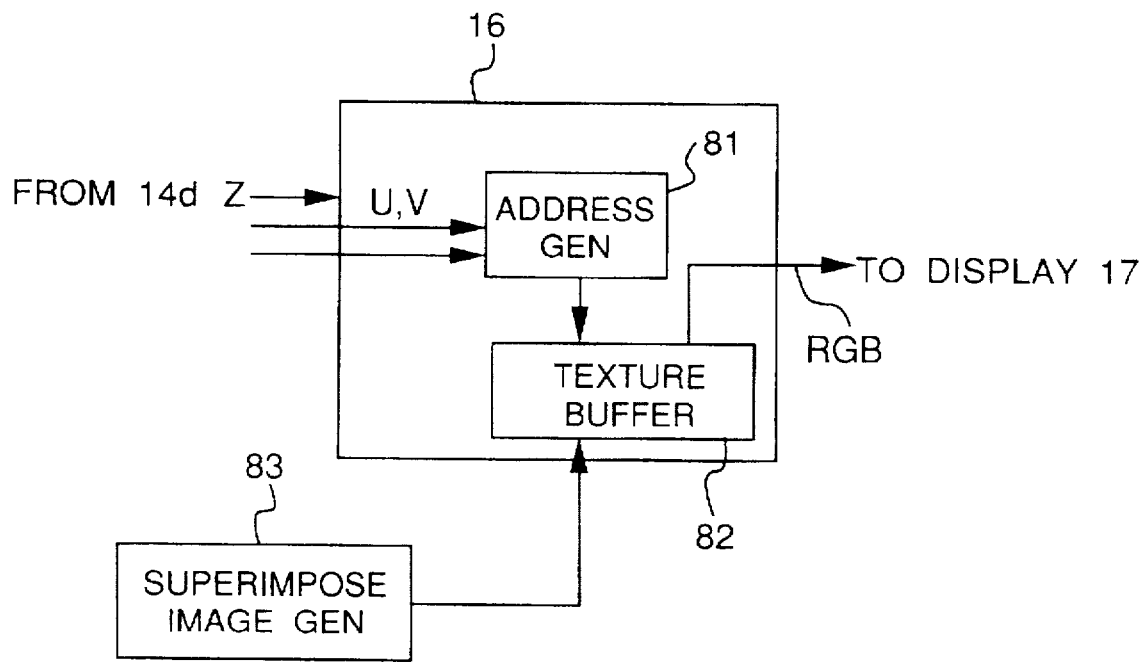
FIG. 8 is a block diagram of the texture mapping according to the preferred embodiment of the present invention.

Referring to FIG. 8, a detail of the texture mapping unit 16 is shown. The texture mapping unit 16 has a texture address generator 81 and a texture buffer 82 which is coupled to a superimpose image generator 83. By the texture mapping unit 16, texture mapping is applied with respect to the (U, V) data. The superimpose image generator 83 produces a color image data to be provided on a U–V plane defined in one frame picture, such as U–V plane on the surface of the cup.

The apparatus for parallel image generation thus comprised operates as follows.

Before the first frame operation cycle, the image data generated by the three-dimensional data generator 9 is distributed by the data distributer 10 to store four divided image data, such as in a manner shown in FIG. 6b, in four buffers 11a, 11b, 11c and 11d.

During the first frame operation cycle, the four divided image data ($X_s$, $Y_s$, $Z_s$, U, V) stored in buffers 11a, 11b, 11c and 11d are processed and stored in frame buffer 64b and Z buffer 65b in four separate image generators 12a, 12b, 12c and 12d, respectively, as pixel data ($Z_s$, U, V).

It is to be noted that the pixel data ($Z_s$, U, V) is defined as (∞, 00, 00) at pixel points outside the cup image.

The during the second frame operation cycle, the same four divided image data ($X_s$, $Y_s$, $Z_s$, U, V) stored in buffers 11a, 11b, 11c and 11d are processed again and the processed results are stored in frame buffer 64b and Z buffer 65b in a similar manner described above, but with different parameters produced from all or some of units 19–22 so that the object may be seen from another viewing angle or may be seen as having made a movement or a rotation.

Also, during the second frame operation cycle, the pixel data stored in frame buffer 64b and Z buffer 65b in four separate image generators 12a, 12b, 12c and 12d are sequentially produced to respective image mergers 14a, 14b, 14c and 14d, but one pixel data cycle delayed between the adjacent image mergers. Also, a background image is sequentially produced to image merger 14a.

For example, in the first pixel data cycle, the first object pixel data ($Z_s$, U, V) for a pixel located at (0,0) is provided from image generator 12a to the first image merger 14a, and also the first background pixel data ($Z_s$, U, V) for a pixel located at (0,0) is provided from the initial image generator 15 to the first image merger 14a. Since there is no object (e.g., cup) at this position, the first object pixel data take a $Z_s$ value equal to infinity ($\infty$). Also, the background pixel data is set to have a great $Z_s$ value, such as $Z_s=1000$. Thus, in the comparator 71 of the first image merger 14a, $\infty > 1000$ is detected to select the background pixel data. Thus, at the end of the first pixel data cycle, the first image merger 14a produces the background pixel data. During this first pixel data cycle no operation is carried out in the other image mergers.

In the second pixel data cycle, the first object pixel data ($Z_s$, U, V) at position (0,0) from image generator 12b and also the first background pixel data ($Z_s$, U, V) at position (0,0) from the first image merger 14a are supplied to the second image merger 14b. For the same reason mentioned above, $\infty > 1000$ is detected by the comparator 71 of the second image merger 14b to select the background pixel data. Thus, at the end of the first pixel data cycle, the second image merger 14b produces the background pixel data. Also during the second pixel data cycle, the second object pixel data ($Z_s$, U, V) for a pixel located at (1,0) is provided from image generator 12a to the first image merger 14a, and also the second background pixel data ($Z_s$, U, V) for a pixel located at (1,0) is provided from the initial image generator 15 to the first image merger 14a. For the same reason mentioned above, the first image merger 14a produces the background pixel data. During this second pixel data cycle no operation is carried out in the third and fourth image mergers.

Figure 6D:
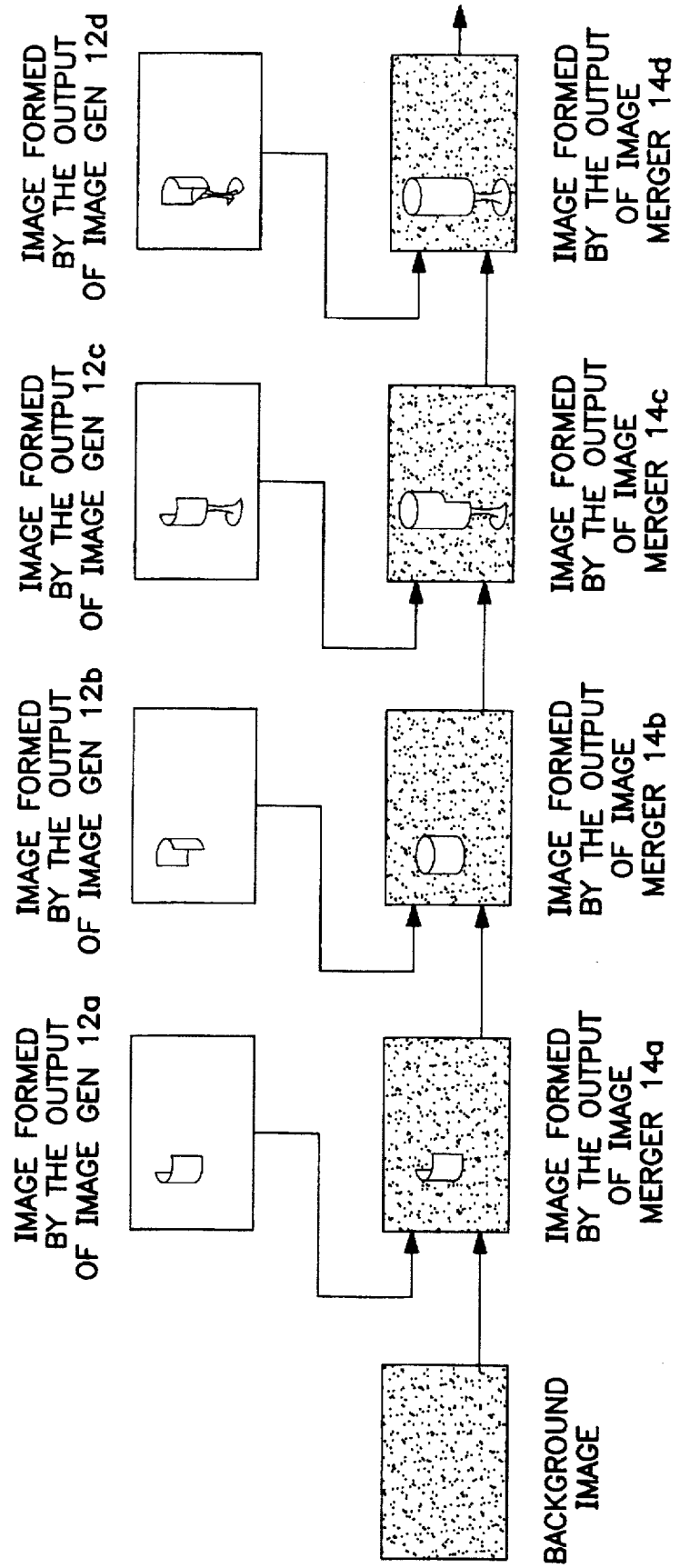
FIG. 6d is a diagrammatic view showing the images which may be formed at different stages in the apparatus of the present invention.

Therefore, as shown in FIG. 6d, the pixel data ($Z_s$, U, V) produced from the first image merger 14a represents an image having a top left portion of the cup provided over the background image. Similarly, the pixel data ($Z_s$, U, V) produced from the second image merger 14b represents an image having a top half portion of the cup provided over the background image. When the top right portion image of the cup is merged with the top left portion image of the cup, the surfaces hidden by the front wall of the cup are removed by the selection of the pixel data which is located closer to the eye location.

The image data produced from the fourth image merger 14d is applied to the texture mapping unit 16 at which the cup surface defined by the U-V coordinates is depicted with an image determined by the superimpose image generator 83.

When the pixel data ($Z_s$, U, V) is applied to the texture mapping unit 16, the $Z_s$ data is eliminated and only the (U, V) data enters the texture mapping unit 16. When the pixel data (U, V) corresponding to the surface of the cup enters the address generator 81, an address in the texture buffer 82 is generated for having an access to a particular area in the buffer 82. The texture buffer 82 is previously stored with a color picture information based on the data obtained from the superimpose image generator 83. Therefore, upon reading the data stored in at the area designated by the address, the texture buffer 82 produces color data (R, G, B).

The apparatus for parallel image generation according to the present invention can easily improve the image processing ability by increasing the number of image generators 12, because the geometric data defining the object to be displayed is partially stored by plural geometric data buffers 11, and this partial geometric data is processed by the respective image generators 12 dedicated to each geometric data buffer. In addition, there is no change in the number of inputs and outputs in each image merger 14 even when the number of parallel processing units is increased. Only the pipeline for image merger 13 becomes longer. This is because the pipeline for image merging 13 comprises a serial connection of initial image generator 15 and plural image mergers 14.

Also, the parallel connected image generators 12 are connected to the image mergers 14, respectively. As a result, the number of parallel processing units in an apparatus for parallel image generation according to the present invention can be increased without limit.

For operating the image merger 14 normally in this construction, the image generator 12 must output the pixel data in a regular sequential image scanning order. It is also necessary for the image generator 12 (e.g., 12b) and the image merger 14 (e.g., 14a) preceding the image merger 14 (e.g., 14b) connected to the outputting means for image generator 12 to simultaneously output the pixel data for the same coordinates. This is achieved by building a frame buffer 64 and Z-buffer 65 into the image generator 12, storing all of the pixel data to be output by the pixel data generator 62, and then outputting the pixel data in regular coordinate sequence.

It is to be noted that the frame buffer and Z-buffer are sized to store pixel data equivalent to one full image, and the input/output buffers are switched when one complete image is generated in the above embodiments. The buffer size can be reduced to the equivalent of one horizontal scan line, for example, and the buffers switched when processing for one horizontal scan line is completed.

Referring to FIG. 10, a block diagram of an apparatus for parallel image generation according to the second embodiment of the present invention is shown. The second embodiment differs from the first shown in FIG. 1 in the elimination of the texture mapping unit 16. In this embodiment, instead of using the data (U, V), color data (R, G, B) is employed. Thus, in the second embodiment the data ($X_1$, $Y_1$, $Z_1$, U, V), ($X_w$, $Y_w$, $Z_w$, U, V) and ($Z_s$, U, V) are replaced with ($X_1$, $Y_1$, $Z_1$, R, G, B), ($X_w$, $Y_w$, $Z_w$, R, G, B) and ($Z_s$, U, V), respectively. As a result, the frame buffer 64 stores the RGB color data in place of the texture coordinates U, V. The pixel data input to the image merger 14 is therefore the Z value and RGB color data, and the image merger 14 outputs the pixel data with the smaller Z value. The output of the image merger pipeline 13 is input directly to the display device 17, which displays the image using the RGB color data.

It is to be noted that the same effect can be used when Y, I, and Q values are substituted for the RGB color data in the above embodiment.

While a smaller Z value is selected in the above embodiments to express a low depth value (i.e., nearer to the viewing point), the depth value can also be defined such that a greater Z value expresses a low depth value. In this case, the image merger 14 selects the high Z value pixel data, and the initial image generator 15 outputs the lowest expressible value as the depth (Z) value. In either case, the result will be the same.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for parallel image generation comprising:
   three-dimensional data generation means for generating a three-dimensional geometric data of an object in an image frame;
   distribution means for dividing said three-dimensional geometric data to N (N is an integer greater than one) geometric data portions;
   first to Nth geometric data buffers for storing said N geometric data portions, respectively;
   first to Nth identical image generation arrangements connected respectively to said first to Nth geometric data buffers, each image generation arrangement generating an image data portion for each pixel in said image frame;

first to Nth identical image merging arrangements connected respectively to said first to Nth image generation arrangements, said first to Nth image merging arrangements also sequentially connected in series arrangement;

initial image generation means for generating a background image data, said initial image generation means connected to said first image merging arrangement, said first image merging arrangement merging said background image data and said image data portion from said first image generation arrangement, and each one of said second to Nth image merging arrangements merging an output merged data from the sequentially previous image merging arrangement and said image data portion from the current image generation arrangement, said Nth image merging arrangement generating surface coordinate data;

timing control means connected to said first to Nth image merging arrangements for controlling a processing time in said first to Nth image merging arrangements such that said current image merging arrangement carries out the merging operation of a pixel after the sequentially previous image merging arrangement has carried out the merging operation of the same pixel; and texture mapping means connected to said Nth image merging arrangement for applying texture mapping to said surface coordinate data.

2. An apparatus for parallel image generation as claimed in claim 1, wherein said image data portion comprises a depth value and attributes of each pixel.

3. An apparatus for parallel image generation as claimed in claim 2, wherein said background image data comprises a highest depth value.

4. An apparatus for parallel image generation as claimed in claim 3, wherein each of said first to Nth image generation arrangements comprises:

pixel data generation means for generating pixel data;

pixel data memory means for storing pixel data;

comparing means for comparing depth value of two conflicting pixel data and storing one pixel data which has a smaller depth value.

5. An apparatus for parallel image generation as claimed in claim 3, wherein each of said first to Nth image merging arrangements comprises:

two inputs for sequentially receiving pixel data for the same identical pixel position;

comparing means for comparing depth value of the received two pixel data; and selecting means for selecting one pixel data which has a smaller depth value.

6. An apparatus for parallel image generation as claimed in claim 3, wherein said attributes of each pixel are color data.

7. An apparatus for parallel image generation as claimed in claim 3, said texture mapping means comprising:

address generator means for generating an address based on said surface coordinate data; and texture buffer means for storing color data, said color data being read out by said address.

8. An apparatus for parallel image generation as claimed in claim 1, further comprising a display means for displaying the merged data after the merging operation in the Nth image merging arrangement.

9. An apparatus for parallel image generation comprising:

three-dimensional data generation means for generating a three-dimensional geometric data of an object in an image frame;

distribution means for dividing said three-dimensional geometric data to N (N is an integer greater than one) geometric data portions;

first to Nth geometric data buffers for storing said N geometric data portions, respectively;

first to Nth identical image generation arrangements connected respectively to said first to Nth geometric data buffers, each image generation arrangement generating an image data portion for each pixel in said image frame;

first to Nth identical image merging arrangements connected respectively to said first to Nth image generation arrangements, said first to Nth image merging arrangements also sequentially connected in series arrangement;

initial image generation means for generating a background image data, said initial image generation means connected to said first image merging arrangement, said first image merging arrangement merging said background image data and said image data portion from said first image generation arrangement, and each one of said second to Nth image merging arrangements merging an output merged data from the sequentially previous image merging arrangement and said image data portion from the current image generation arrangement, said Nth image merging arrangement generating surface coordinate data;

timing control means connected to said first to Nth image merging arrangements for controlling a processing time in said first to Nth image merging arrangements such that said current image merging arrangement carries out the merging operation of a pixel after the sequentially previous image merging arrangement has carried out the merging operation of the same pixel; and texture mapping means connected to said Nth image merging arrangement for applying texture mapping to said surface coordinate data, wherein said image data portion for each pixel comprises a depth value and attributes of each pixel; and wherein each of said first to Nth image merging arrangements comprises:

two inputs for sequentially receiving pixel data for the same pixel position;

comparing means for comparing the depth value of each of the received two pixel data; and selecting means for selecting one pixel data which has a smaller depth value.

* * * * *

UNITED STATES PATENT AND TRADE MARK OFFICE
CERTIFICATE OF CORRECTION

PATENT NO.   : 5,761,401
DATED        : June 2, 1998
INVENTOR(S)  : Kobayashi et al.

It is certified that error appears in the above-identified patent and that said Letters Patent is hereby corrected as shown below:

On title page, item
[56]   FOREIGN PATENT DOCUMENTS

92/09947      6/1992    WIPO

Signed and Sealed this

First Day of December, 1998

*Attest:*

BRUCE LEHMAN

*Attesting Officer*    *Commissioner of Patents and Trademarks*